United States Patent

[11] 3,595,331

[72] Inventors Theodor Reinhard Gast
Berlin;
Horst Hertel, Gottingen-Weende, both of, Germany
[21] Appl. No. 781,115
[22] Filed Dec. 4, 1968
[45] Patented July 27, 1971
[73] Assignee Sartorius Werke G.m.b.H. (und vormals Gottinger Prarisionswaagenfabrik G.m.b.H.)
[32] Priority Dec. 20, 1967
[33] Germany
[31] P 15 49 280.5

[54] ELECTRONIC BALANCE
7 Claims, 1 Drawing Fig.
[52] U.S. Cl. .................................................. 177/210
[51] Int. Cl. ..................................................... G01g 3/14
[50] Field of Search ......................................... 177/246, 210, DIG. 5

[56] References Cited
UNITED STATES PATENTS
2,631,027 3/1953 Payne .......................... 177/210
3,305,035 2/1967 Gast ............................. 177/210 X
FOREIGN PATENTS
521,544 5/1940 Great Britain ............... 177/MAGNETS
521,585 5/1940 Great Britain ............... 177/MAGNETS

*Primary Examiner*—Richard B. Wilkinson
*Assistant Examiner*—George H. Miller, Jr.
*Attorney*—Edmund M. Jaskiewicz ABSTRACT: A balance beam adapted to carry a load is mounted on a balance beam support for pivotal deflection on a balance beam aXis from a no-load position in response to said load. Inductive indicating and magnetic compensating means for indicating said load and for an automatic compensation of said pivotal deflection comprise a pair of rotary moving coils secured to said balance beam on opposite sides of said balance beam axis. A pair of stationary permanent magnets, which are carried by said support and each of which is associated with one of said rotary moving coils, and a pair of identical, stationary, framelike field coils carried by said support and adapted to be fed with alternating current. The field coils are each disposed beside and slightly spaced from one of the rotary moving coils associated therewith. Said field coils are symmetrically disposed with respect to said balance beam axis and symmetrically disposed with respect to a reference plane which in said no-load position of said balance beam extends through said balance beam axis and parallel to said balance beam. Said field coils extends transversely to said reference plane.

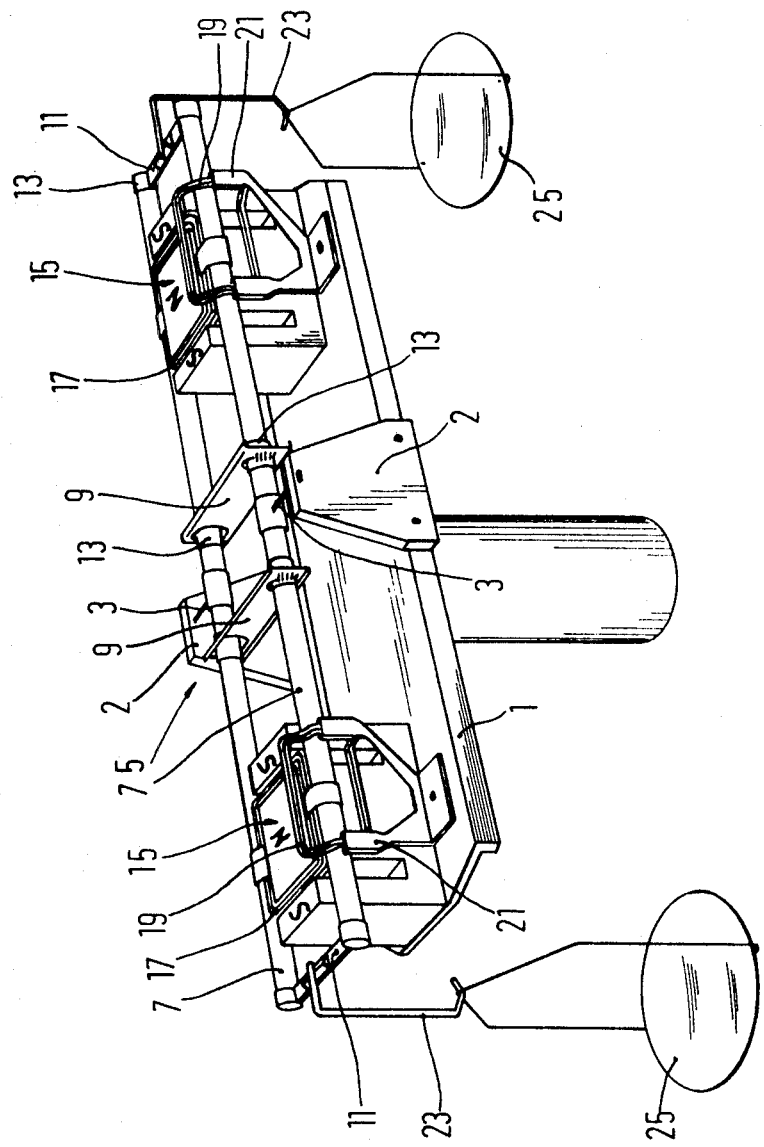

ELECTRONIC BALANCE

This invention relates to an electronic balance having inductive means for indicating the angle of pivotal deflection of the balance beam and means for an automatic magnetic compensation of the load, which balance comprises identical framelike field coils fed with alternating current and disposed beside rotary moving coil means and closely spaced therefrom and symmetrically to the axis of rotation of said means and transversely and symmetrically to a plane which in the initial position of the rotary moving coil means extends through the axis of rotation and is parallel to the convolutions thereof. Such balance has been described in the U.S. Pat. No. 3,305,035.

In accordance with that patent, the rotary moving coil means consists of a single rotary moving coil, which is suspended by torsion bands and is rotatable about these torsion bands on a pivot which consists of a permanent magnet, which is disposed in the interior of the coil. The torsion bands serve also as a pivot for the balance beam, which is connected to the rotary moving coil for rotation therewith.

At both ends, the balance beam carries a hanger for carrying the load and weights, respectively. Only a small part of the maximum load, e.g., one-tenth thereof, is weighed electronically.

Two of the above-mentioned field coils which are fed with alternating current are stationary and disposed beside and closely spaced from that side of the rotary moving coil which is opposite to the balance beam. These field coils are fed in opposite senses with alternating current so that the voltages they induce in the rotary moving coil offset each other when the rotary moving coil is in its zero position.

When the rotary moving coil is moved to an oblique position under the influence of a load, the opposing signals which are produced by the field coils in the rotary moving coil do not entirely offset each other and a differential signal is produced in the rotary moving coil. The magnitude and sign of said signal represent the angle through which the rotary moving coil has been deflected. The signal is applied to a device such as is described in the German Pat. Specification 914,445, and in said device is amplified, rectified in consideration of its phase angle, amplified once more and returned to the rotary moving coil in such a sense that it cooperates with the field of the permanent magnet to return the rotary moving coil toward its initial position. The entire arrangement acts like a very stiff torsion spring, which permits the rotary moving coil to perform a rotation which is proportional to the load. The rotation is so small that even a loaded balance beam, which is magnetically compensated, assumes apparently a horizontal position. In the case of a load unbalance, a slight deflection is required to produce an alternating current signal for producing the compensating direct current applied to the rotary moving coil.

The direct current which is returned to the rotary moving coil is proportional to the load or, more exactly, to the difference between the load and the counterweights. Hence, the load can be indicated by an ammeter, which measures that direct current and is calibrated in weight units.

The single rotary moving coil provided in the balance defined first hereinbefore can exert only a relatively small torque on the balance beam so that only relatively small loads can be weighed. This disadvantage cannot be eliminated in that the direct current which is returned to the rotary moving coil is given a desired value. This would result in an undesired reaction on the permanent magnet and the wire of the rotary moving coil would become hot. In both cases, there would no longer be a linear relation between the direct current and the load and the balance would be inaccurate.

According to the invention, the total torque in a balance of the kind defined first hereinbefore can be much increased in that the rotary moving coil means comprise at least a pair of rotary moving coils, which are secured, preferably in a symmetrical arrangement, to the balance beam on both sides of the axis of said beam, and a stationary permanent magnet and a stationary field coil are associated with each rotary moving coil.

Instead of one, central rotary moving coil, at least two rotary moving coils are provided, which are disposed on opposite sides of the axis of the balance beam. Hence, each coil no longer revolves on an axis which intersects said coil, but on the axis of the balance beam, i.e., on an axis which is disposed outside the coil. Each rotary moving coil may be disposed close to its hanger and even outside the hanger. Finally, more than one rotary moving coil may be disposed on each side of the axis of the balance beam. The arrangement will desirably always be symmetrical so that each rotary moving coil which is disposed on the right of the beam axis has associated with it a rotary moving coil which has the same size and position and is disposed on the left of the axis. For the sake of simplicity, a system will be described hereinafter in which two rotary moving coils are respectively disposed on the right and left of the axis of the balance beam.

The overall torque which can be produced by the two rotary coils is not merely twice the torque which can be produced by a single rotary moving coil because the torque increases also with the distance of the conductors of the rotary moving coil from the axis of the balance beam. These larger distances also increase the sensitivity of the balance because for a given angular deflection of the balance beam the conductors of a rotary moving coil which is in an outer position are lifted or lowered in the magnetic field by a larger amount than the conductors of a central rotary moving coil.

In the case of very high requirements as to accuracy, it is significant that a magnetic field in a magnetic flux-carrying gap will be more homogeneous if the conductors of the rotary moving coil describe a path having a larger radius of curvature in the path.

For a balance having a larger maximum load it may also be significant that a balance beam according to the invention can be supported by knife edge members because there is neither a rotary moving coil nor a permanent magnet close to the axis of the balance beam. Such coil or permanent magnet would occupy the space required for a knife edge bearing.

The balance beam may preferably consist of a substantially horizontally extending frame, which has two spars, which are firmly interconnected by rungs and between the rotary moving coils are disposed, which are secured to said spars.

In this way the balance beam is stiffened and the rotary moving coils are accommodated in a space-saving manner within the framework of the balance beam. The rotary moving coils can be secured in a simple and reliable manner to the spars of the frame.

The field coils may be curved from the outside about the adjacent spar of the balance beam. This has the advantage that their mainly effective conductor parts, which are parallel to the spars, are only slightly spaced from the rotary moving coils and only those parts of said field coils which have no influence on the rotary moving coils are disposed on the outside of the spar.

The permanent magnets are preferably E-shaped, the intermediate leg forms one pole and the two outer legs form the other pole, said legs extend upwardly and the rotary moving coils surround the intermediate legs.

The electromagnetic arrangement must be such as to produce the desired effects. For instance, the direct currents in the rotary moving coils must exert coacting torques on the balance beam; this requires a specific pole arrangement and a specific connection of the rotary moving coils. Besides, the field coils must induce coacting AC signals in the balance beam. These requirements can be met in various ways, e.g., in that the poles of the magnets of each pair are similarly arranged, and the associated rotary moving coils are connected to the amplifier in opposite senses and the field coils are connected to the amplifier in the same sense. The same result can be produced by opposing pole arrangements and a connection of the rotary moving coils in the same sense and of the field coils in opposite senses.

An embodiment of the invention will now be described by way of example with reference to the accompanying drawing, which is a perspective view showing a balance having two magnet-coil systems.

A stationary baseplate 1 carries two standards 2. The framework of the balance beam is generally designated 5 and rotatably mounted between said standards by two short torsion bands 3. The framework consists of two quartz spars 7, which are firmly interconnected by crossbars or rungs 9, 11. The spars carry metallic sleeves 13, which are disposed at the points where the rungs are connected. The rungs are soldered to said sleeves.

Two E-shaped magnets 15 of hard magnetic ferrite are secured to the baseplate 1. The two outer legs of said magnets form like poles, here South poles, and the intermediate leg forms the other pole, here the North pole. Oppositely directed fields are thus obtained in the two magnetic flux-carrying gaps of each E-shaped magnet.

The rotary moving coils 17 are mounted in fixed positions between the spars 7 in such a manner that they surround the intermediate pole and can move up and down in the magnetic flux-carrying gaps without contacting the magnets.

Each E-shaped magnet has an AC field coil 19 associated with it. This coil is secured to the baseplate 1 with the aid of a mounting 21. The field coils 19 are curved around the forward spar 7 toward the rotary moving coils 17 so that the upper and lower horizontal conductors of each field coil extend beside the associated rotary moving coil and are only slightly spaced from it and the latter coil can perform a pivotal movement beside the field coils without contacting the same. The field coils also provide the space required for the movement of the forward spar 7.

Hangers 23 for respective pans 25 of the balance are connected to the end rungs 11 of the framework.

To increase the torque, the magnet-coil systems might be disposed outside the hangers 23 rather than inside the same. In this case the baseplate 1 must have a correspondingly larger length and be formed with openings for the hangers. Outer magnet systems may also be provided in addition to those which are shown in the drawing.

To eliminate errors due to buoyancy, the entire balance may be accommodated in an airtight housing, which can be evacuated.

What we claim is:

1. An electronic balance, which comprises a balance beam support, a balance beam adapted to carry a load and mounted on said support for pivotal deflection on a balance beam axis from a no-load position in response to said load, and inductive indicating and magnetic compensating means for indicating said load and for an automatic compensation of said pivotal deflection, said means comprising at least one pair of moving coils secured to said balance beam and disposed on both sides of said balance beam axis, stationary permanent magnets carried by said support and associated each with one of said moving coils, and at least one pair of identical, stationary, framelike field coils carried by said support and adapted to be fed with alternating current, said field coils being each associated with one of said moving coils and disposed beside and slightly spaced from the moving coil associated therewith, said field coils being symmetrically disposed with respect to said balance beam axis and with respect to a reference plane which in said no-load position of said balance beam extends through said balance beam axis and parallel to said balance beam, said field coils extending transversely to said reference plane.

2. An electronic balance as set forth in claim 1, in which said moving coils are symmetrically disposed with respect to said balance beam axis.

3. An electronic balance as set forth in claim 1, in which said balance beam comprises a substantially horizontally extending framework having two spars and rungs connecting said spars, and said moving coils are disposed between and secured to said spars.

4. An electronic balance as set forth in claim 3, in which said field coils are disposed adjacent to one of said spars on the outside thereof and are curved around said one spar.

5. An electronic balance as set forth in claim 1, in which said permanent magnets are E-shaped and comprise each two outer legs and an intermediate leg, said outer legs of each of said permanent magnets form like poles, said intermediate leg of each of said permanent magnets forms a pole which is unlike that of said outer legs of the same magnet, said legs are upwardly directed and each of said moving coils surrounds said intermediate leg of the associated magnet.

6. An electronic balance as set forth in claim 5, in which corresponding legs of both said magnets form like poles, said moving coils are adapted to be fed with direct current in opposite senses, and said field coils are fed with said alternating current in the same sense.

7. An electronic balance as set forth in claim 5, in which corresponding legs of both said magnets form unlike poles, said moving coils are adapted to be fed with direct current in the same sense, and said field coils are fed with said alternating current in opposite senses.